United States Patent
Yu et al.

(10) Patent No.: US 9,047,051 B2
(45) Date of Patent: Jun. 2, 2015

(54) DOCKING STATION AND DISPLAY SYSTEM

(71) Applicants: Po-Chin Yu, Taipei (TW); Long-Cheng Chang, Taipei (TW); Chih-Wei Lu, Taipei (TW); Chun-Te Shen, Taipei (TW)

(72) Inventors: Po-Chin Yu, Taipei (TW); Long-Cheng Chang, Taipei (TW); Chih-Wei Lu, Taipei (TW); Chun-Te Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 212 days.

(21) Appl. No.: 13/773,650

(22) Filed: Feb. 22, 2013

(65) Prior Publication Data
US 2014/0177153 A1 Jun. 26, 2014

(30) Foreign Application Priority Data

Dec. 20, 2012 (TW) .............................. 101148796 A

(51) Int. Cl.
*G06F 1/16* (2006.01)

(52) U.S. Cl.
CPC .................................... *G06F 1/1632* (2013.01)

(58) Field of Classification Search
USPC ............. 361/679.21, 679.47, 679.55, 679.56; 710/303, 304
See application file for complete search history.

(56) References Cited

U.S. PATENT DOCUMENTS

| 6,072,695 | A  | * | 6/2000  | Steiger et al. ............ 361/679.41 |
|---|---|---|---|---|
| 6,833,988 | B2 | * | 12/2004 | Kamphuis et al. ........ 361/679.41 |
| 7,417,855 | B2 | * | 8/2008  | Carnevali ................. 361/679.41 |
| 7,426,108 | B2 | * | 9/2008  | Carnevali ................. 361/679.41 |
| 7,508,661 | B2 | * | 3/2009  | Carnevali ................. 361/679.41 |
| 7,583,495 | B2 | * | 9/2009  | Carnevali ................. 361/679.29 |
| 8,179,672 | B2 | * | 5/2012  | Carnevali ................. 361/679.41 |
| 8,223,483 | B2 | * | 7/2012  | Hayashida et al. ...... 361/679.41 |
| 8,681,484 | B2 | * | 3/2014  | Onodera .................. 361/679.01 |
| 8,780,546 | B2 | * | 7/2014  | Zhou ........................ 361/679.41 |
| 2004/0066620 | A1 | * | 4/2004 | Grunow et al. ............... 361/686 |
| 2006/0221565 | A1 | * | 10/2006 | Doherty et al. ............... 361/683 |
| 2013/0050933 | A1 | * | 2/2013  | Prest ........................ 361/679.41 |
| 2013/0155596 | A1 | * | 6/2013  | Sun ......................... 361/679.21 |
| 2013/0170131 | A1 | * | 7/2013  | Yen ......................... 361/679.44 |

FOREIGN PATENT DOCUMENTS

TW    I318095    12/2009

\* cited by examiner

*Primary Examiner* — Lisa Lea Edmonds
(74) *Attorney, Agent, or Firm* — Jianq Chyun IP Office

(57) ABSTRACT

The invention provides a docking station, which includes a base, a tray and an electrical connector. The base has a chamber. The tray is slidingly disposed at the chamber. The electrical connector is slidingly disposed at the base and disposed at a side of the tray, in which the tray moves under a pressing force to drive the electrical connector for moving. The invention also provides a display system, which includes an electronic device and a docking station, so that the electronic device is detachably disposed at the docking station to expand the applications thereof.

15 Claims, 14 Drawing Sheets

DOCKING STATION AND DISPLAY SYSTEM

CROSS-REFERENCE TO RELATED APPLICATION

This application claims the priority benefit of Taiwan application serial no. 101148796, filed on Dec. 20, 2012. The entirety of the above-mentioned patent application is hereby incorporated by reference herein and made a part of this specification.

BACKGROUND OF THE INVENTION

1. Field of the Invention

The invention generally relates to a docking station and a display system, and more particularly, to a docking station and a display system suitable for an electronic device to be detachably disposed therein.

2. Description of Related Art

In recent years, with the advancement of technology, the application of electronic products is becoming more and more popular. In addition, the electronic product is being improved towards the design direction of lightweight and smaller size, which makes the electronic products have greater convenience to meet the needs of the user. Electronic products, however, after reduction their volume, the position used to the functional equipments is restricted as well. Accordingly, in order to allow the electronic products with smaller volume can keep the original functions in addition to maintaining the convenience, even to allow using other additional equipments, many different types of docking stations are consequential. After an electronic product combined with an appropriate and conformable docking station, external connection devices, such as mouse, external hard drive, and network connector, can be connected to the electronic device through the docking station so as to obtain more functions.

Taking a tablet computer as an example, a tablet computer with touch function can be operated by touching its screen. In this case, the screen of the tablet computer serves as a user interface, and meanwhile, the screen also provides frames corresponding to the tablet computer for users to view. Therefore, the screen is required to provide a variety of application functions, which may cause the applications interfered with each other. In addition, the slim size of a tablet computer requires a smaller screen size so that the smaller frame displayed by the tablet computer, limited by the screen dimension, affects the viewing quality for the user.

SUMMARY OF THE INVENTION

Accordingly, the invention is directed to a docking station, suitable for an electronic device to be detachably disposed therein.

The invention is also directed to a display system with good usability.

The invention provides a docking station, which includes a base, a tray and an electrical connector. The base has a chamber. The tray is slidingly disposed at the chamber. The electrical connector is slidingly disposed at the base and disposed at a side of the tray, in which the tray moves under a pressing force to drive the electrical connector for moving.

In an embodiment of the invention, the docking station further includes a display connected to the base and electrically connected to the electrical connector.

In an embodiment of the invention, the base has a first guiding post, the electrical connector has a first guiding groove, and the first guiding post is engaged with the first guiding groove so that the electrical connector is able to move in relative to the base. The tray has a locking opening, the electrical connector has a locking bump, and when the tray moves, by means of engaging the locking bump with the locking opening, the tray drives the electrical connector to move through the moving of the first guiding groove along the first guiding post.

In an embodiment of the invention, the docking station further includes a transmission module and a button. The transmission module is disposed at the base and connected to the tray, and the button is movably disposed at the base and connected to the transmission module, in which the button controls the transmission module to drive the tray for moving or not.

In an embodiment of the invention, the transmission module includes a transmission element and a restoration element. The transmission element is disposed at a side of the base and connected to the tray. The restoration element is connected to the base and the transmission element.

In an embodiment of the invention, the transmission element has a second guiding post, the tray has a second guiding groove, the second guiding post is engaged with the second guiding groove, and the restoration element drives the transmission element, and then drives the second guiding groove for moving through the second guiding post, and finally drives the tray for moving.

In an embodiment of the invention, the transmission module further includes a rotation shaft disposed at the base and having a gear and a ratchet, in which the transmission element has a rack, the gear is engaged with the rack. The button is pivoted to the base and has an elastic element and a pawl, the elastic element is connected to the button and the base, and the ratchet is engaged with the pawl.

In an embodiment of the invention, the display is a flat-panel display.

In an embodiment of the invention, the display includes a projection screen and a projection module, and the projection screen and the projection module are respectively connected to the base.

In an embodiment of the invention, the tray, under the pressing force, moves along a first path so as to drive the electrical connector for moving along a second path.

In an embodiment of the invention, the first path is roughly perpendicular to the second path.

In an embodiment of the invention, the first path is roughly parallel to the normal direction of the chamber.

The invention further provides a display system, which includes an electronic device and a docking station. The docking station includes a base, a tray and an electrical connector. The base has a chamber. The tray is slidingly disposed at the chamber along a first path. The electrical connector is slidingly disposed at the base and disposed at a side of the tray, in which when the tray moves along the first path under a pressing force, the tray drives the electrical connector for moving along a second path so that the electrical connector is electrically connected to the electronic device.

In an embodiment of the invention, the docking station further includes a display connected to the base and electrically connected to the electrical connector, and the electronic device is electrically connected with the display through the electrical connector so that the display displays a frame corresponding to the electronic device.

In an embodiment of the invention, the display includes a projection screen and a projection module, the projection screen and the projection module are respectively connected to the base, and the projection module is suitable for being electrically connected to the electronic device to project the frame corresponding to the electronic device onto the projection screen.

In an embodiment of the invention, the dimensions of length and width of the electronic device are roughly the same as the dimensions of length and width of the chamber.

Based on the description above, the docking station and the display system of the invention make the electronic device detachably disposed at the docking station. When the electronic device is disposed at the chamber, the tray of the docking station under a pressing force moves to drive the electrical connector for moving, so that the tray, through driving the electrical connector for moving, is electrically connected to the electronic device. Therefore, the electronic device can be detachably disposed at the docking station to expand the applications thereof, so that the display system has good usability.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
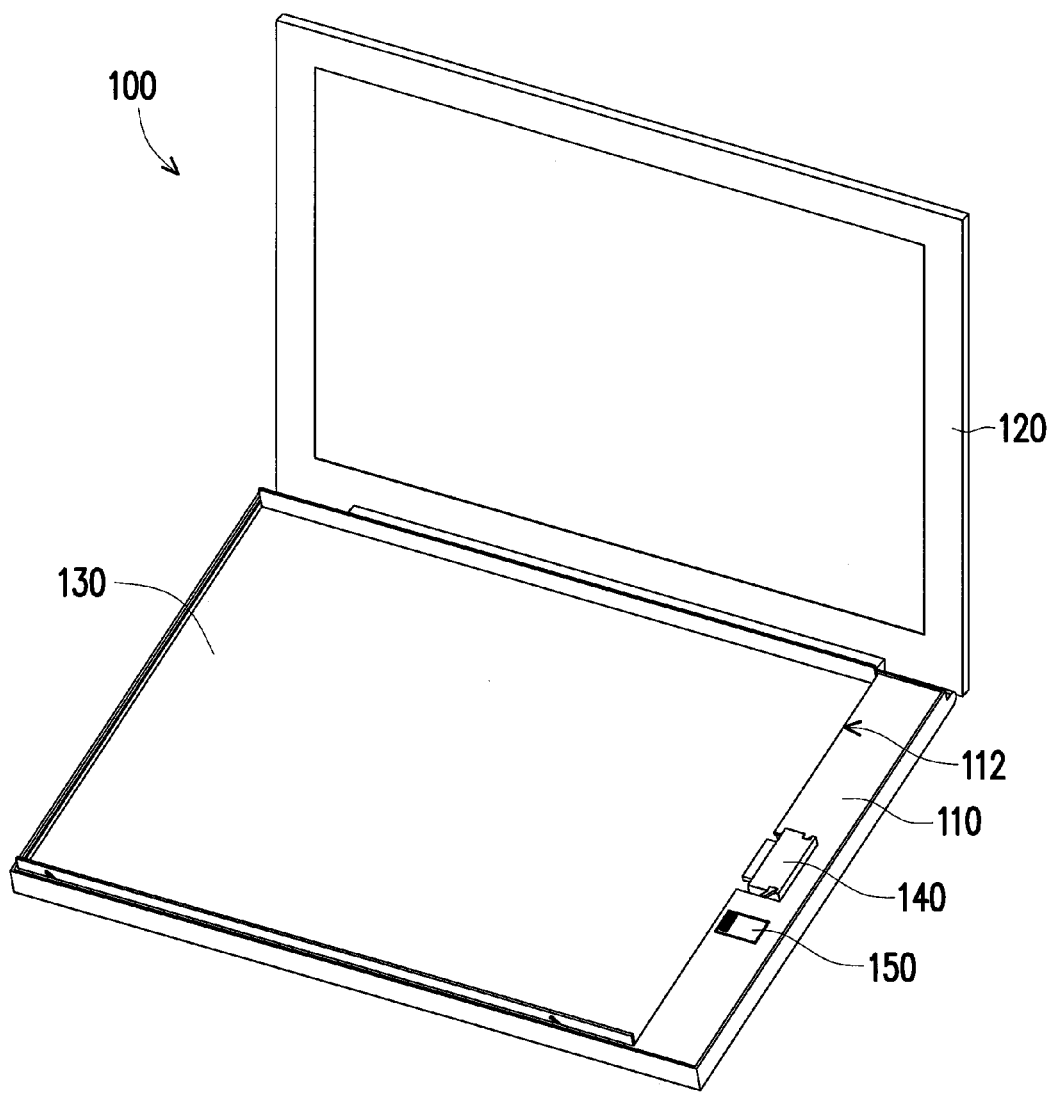
FIG. 1 is a schematic diagram of a docking station according to an embodiment of the invention.

FIG. 1 is a schematic diagram of a docking station according to an embodiment of the invention. Referring to FIG. 1, in the embodiment, a docking station 100 includes a base 110, a display 120, a tray 130 and an electrical connector 140. The base 110 has a chamber 112, and the display 120 is connected to the base 110 and electrically connected to the electrical connector 140. The tray 130 is slidingly disposed at the chamber 112 and is able to move into or out of the chamber 112. The electrical connector 140 is slidingly disposed at the base 110 and disposed at a side of the tray 130. As a result, the tray 130 can move into or out of the chamber 112 under a pressing force so as to drive the electrical connector 140 for moving into or out of the chamber 112.

Figure 2A:
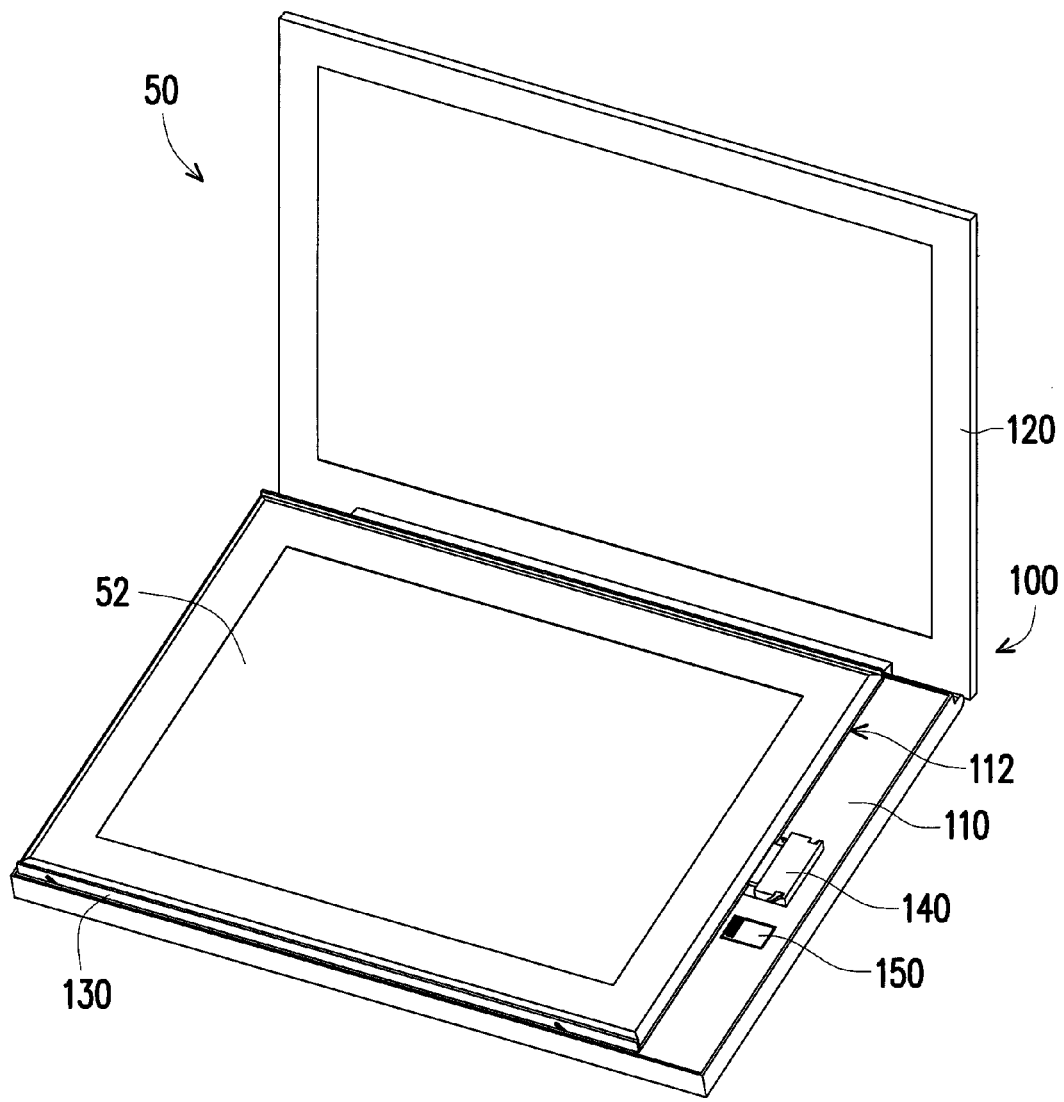
FIG. 2A is a schematic diagram showing the electronic device of the display system in FIG. 1 is disposed at the tray.
Figure 2B:
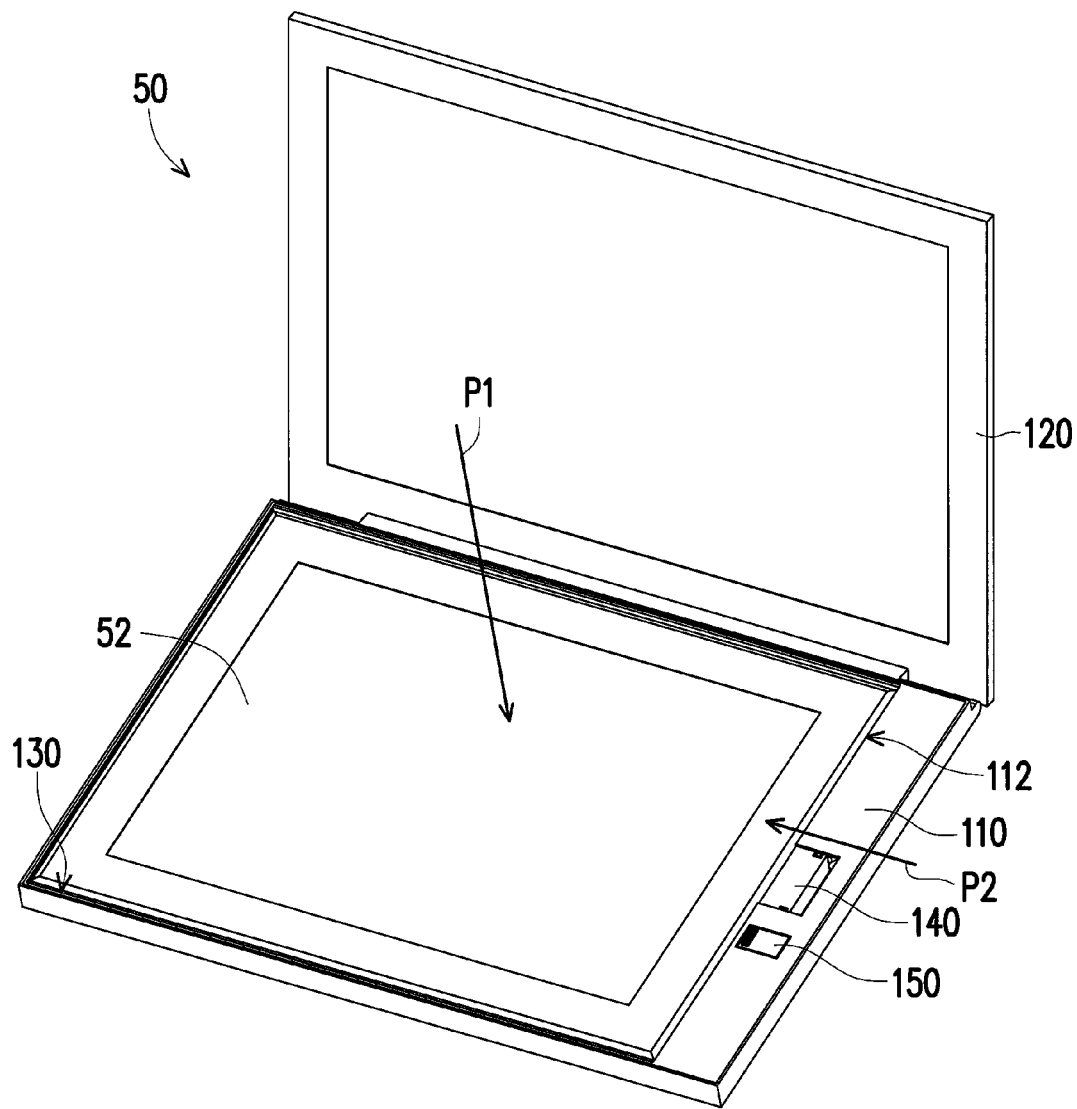
FIG. 2B is a schematic diagram showing the electronic device of the display system in FIG. 1 is connected to the electrical connector.
Figure 3A:
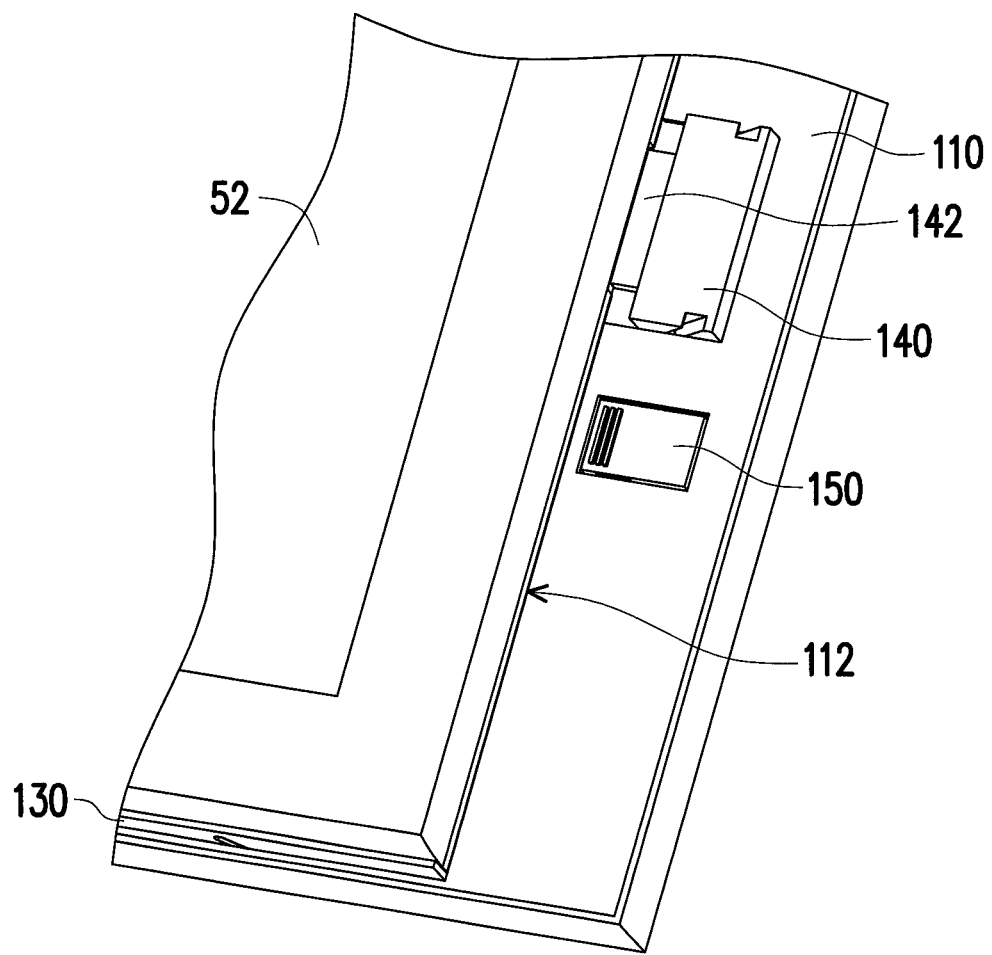
FIG. 3A is a local enlarged diagram of the display system of FIG. 2A.
Figure 3B:
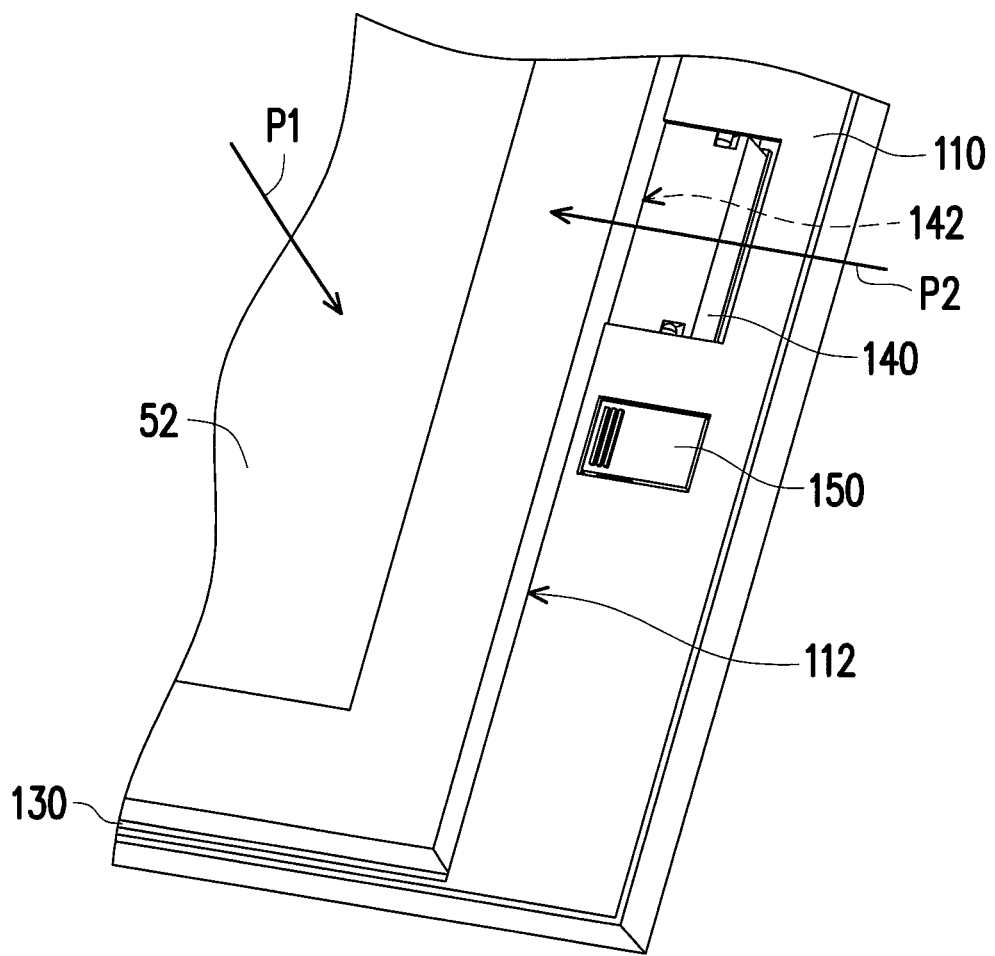
FIG. 3B is a local enlarged diagram of the display system of FIG. 2B.

FIG. 2A is a schematic diagram showing the electronic device of the display system in FIG. 1 is disposed at the tray, FIG. 2B is a schematic diagram showing the electronic device of the display system in FIG. 1 is connected to the electrical connector, FIG. 3A is a local enlarged diagram of the display system of FIG. 2A and FIG. 3B is a local enlarged diagram of the display system of FIG. 2B. Referring to FIGS. 2A, 2B, 3A and 3B, in the embodiment, a display system 50 includes an electronic device 52 and the docking station 100. The electronic device 52 is configured to be disposed at the tray 130 and to move with the tray 130 into or out of the chamber 112. Therefore, the electronic device 52 can be electrically connected to the display 120 via the electrical connector 140 and the display 120 can display frames corresponding to the electronic device 52. In the embodiment, the electronic device 52 is a tablet computer, which the invention is not limited to. Furthermore, in the embodiment, the dimensions of length and width of the electronic device 52 is roughly the same as the dimensions of length and width of the chamber 112, which the invention is not limited to.

In more details, the tray 130 is slidingly disposed at the chamber 112 along a first path P1, and the electronic device 52, at beginning, is disposed on the tray 130 outside the chamber 112. At the time, a connecting terminal 142 of the electrical connector 140 is not connected to the electronic device 52 yet, as shown by FIGS. 2A and 3A. While the tray 130 under a pressing force is moving along the first path P1 into the chamber 112, the tray 130 drives the electrical connector 140 to move along the second path P2 into the chamber 112 so as to be electrically connected to the electronic device 52. As a result, the electronic device 52 can be placed at the tray 130 and then, by applying a pressing force to the tray 130, moves into the chamber 112 with the tray 130 along the first path P1, so that the electrical connector 140 is connected to the electronic device 52 via the connecting terminal 142 and the display 120 is electrically connected to the electronic device 52 to display frames corresponding to the electronic device 52, as shown by FIGS. 2B and 3B.

In addition, the docking station 100 further has a button 150, in which the button 150 is movably disposed at the base 110 to control the tray 130 for moving or not. After the electronic device 52 moves with the tray 130 along the first path P1 to be located in the chamber 112 and electrically connected to the electrical connector 140 moving into the chamber 112 along the second path P2, the electronic device 52 is able to, by pressing the button 150, move out of the chamber 112 with the tray 130 reversely along the first path P1. At the time, the tray 130 drives the electrical connector 140 to move out of the chamber 112 reversely along the second path P2 to release the connection thereof from the electronic device 52, in which the action process is from FIG. 2B to FIG. 2A. Therefore, the docking station is suitable for an electronic device to be detachably disposed therein.

Moreover, in the embodiment, when the tray 130 under a pressing force moves along the first path P1 to drive the electrical connector 140 for moving along the second path P2, the first path P1 is roughly perpendicular to the second path P2 and the first path P1 is roughly parallel to the normal direction of the chamber 112. Thus, when the tray 130 under a pressing force moves into or out of the chamber 112 along the first path P1 roughly parallel to the normal direction of the chamber 112, the tray 130 in moving along the first path P1 can drive the electrical connector 140 to move into or out of the chamber 112 along the second path P2 roughly perpendicular to the first path P1.

Figure 4A:
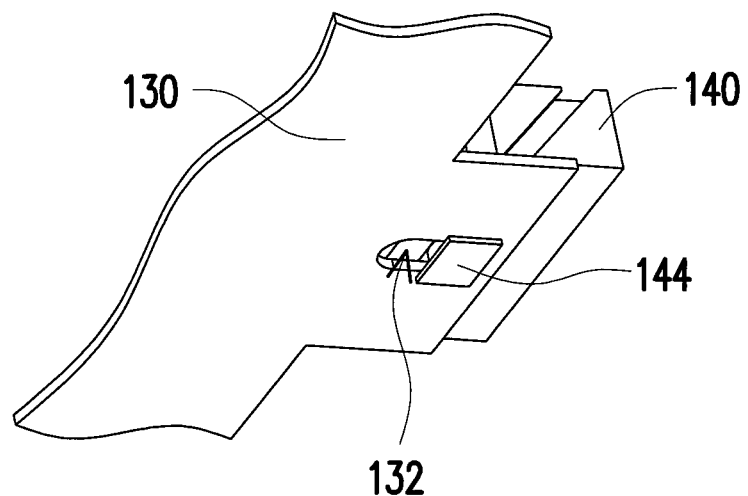
FIG. 4A is a partial enlarged diagram of the docking station of FIG. 2A locally at the electrical connector from another angle of view.
Figure 4B:
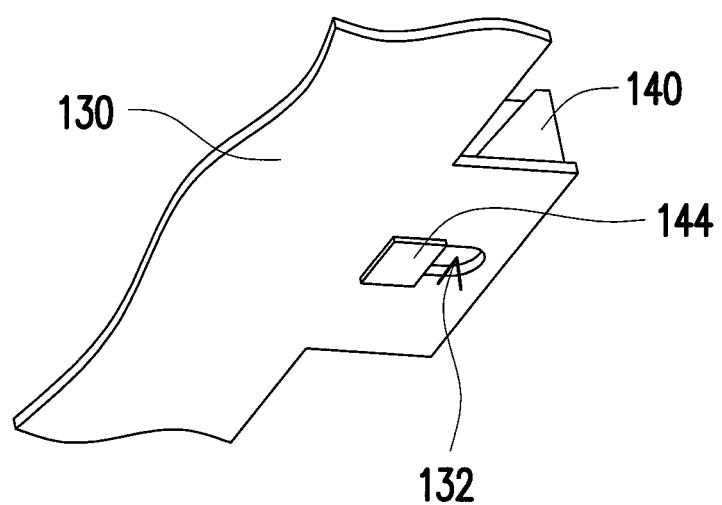
FIG. 4B is a partial enlarged diagram of the docking station of FIG. 2B locally at the electrical connector from another angle of view.

FIG. 4A is a partial enlarged diagram of the docking station of FIG. 2A locally at the electrical connector from another angle of view and FIG. 4B is a partial enlarged diagram of the docking station of FIG. 2B locally at the electrical connector from another angle of view. Referring to FIGS. 4A and 4B, in the embodiment, the tray 130 has a locking opening 132 and the electrical connector 140 has a locking bump 144. While the tray 130 moves along the first path P1, the tray 130, through the locking bump 144 engages with the locking opening 132, drives the electrical connector 140 for moving along the second path P2.

Figure 5A:
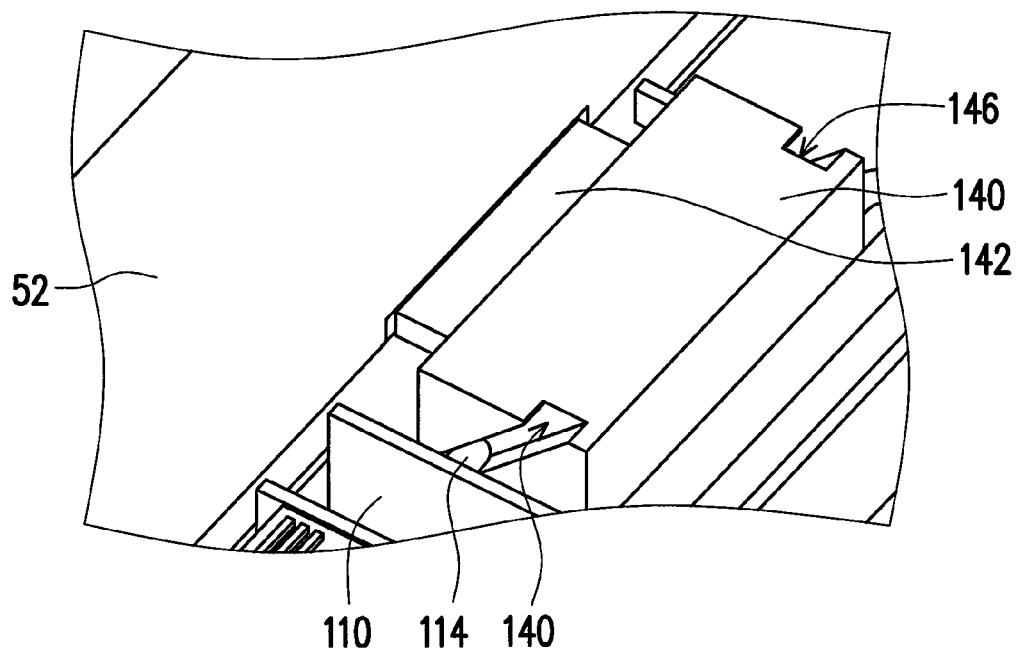
FIG. 5A is a partial enlarged diagram of the docking station of FIG. 2A locally at the electrical connector.
Figure 5B:
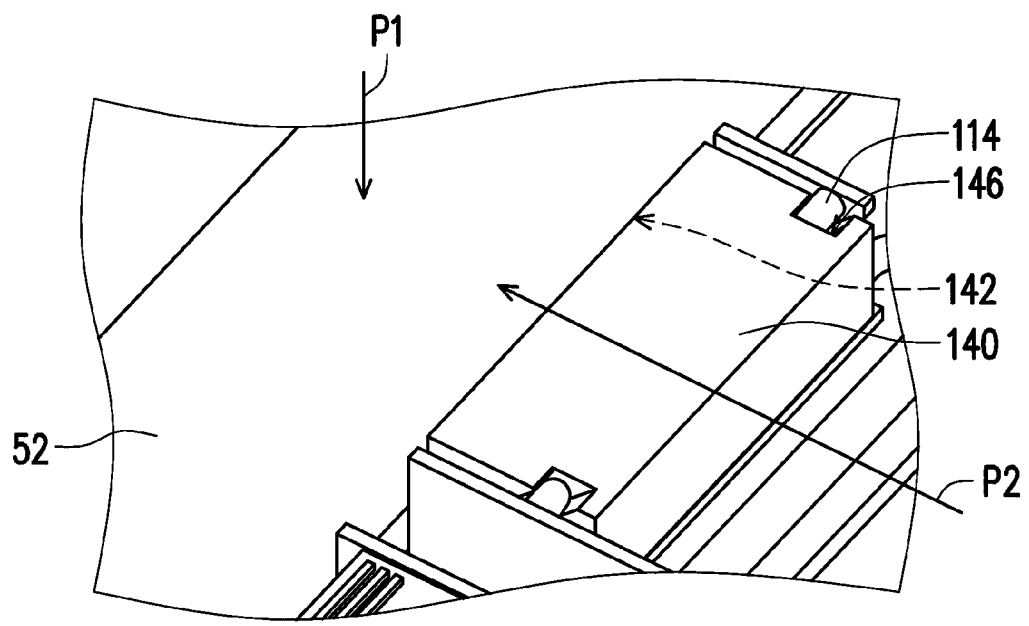
FIG. 5B is a partial enlarged diagram of the docking station of FIG. 2B locally at the electrical connector.

In more details, it should refer to FIGS. 5A and 5B, in which FIG. 5A is a partial enlarged diagram of the docking station of FIG. 2A locally at the electrical connector and FIG. 5B is a partial enlarged diagram of the docking station of FIG. 2B locally at the electrical connector. In the embodiment, the base 110 has a first guiding post 114, the electrical connector 140 has a first guiding groove 146, and the first guiding groove 146 is engaged with the first guiding post 114 to make the electrical connector 140 be able to move in relative to the base 110. Therefore, when the tray 130, through the locking bump 144 engages with the locking opening 132, drives the electrical connector 140 for moving, the electrical connector 140, through the moving of the first guiding groove 146 along the first guiding post 114, moves into or out of the chamber 112.

It should be noted that in the embodiment, when the tray 130 drives the electrical connector 140 to move, the moving direction of the tray 130 (the first path P1) is different from the moving direction of the electrical connector 140 (the second path P2). Moreover, the first path P1 is roughly perpendicular to the second path P2. Therefore, the first guiding groove 146 of the electrical connector 140 is an oblique guiding groove. When the tray 130 downwards moves along the first path P1, the locking opening 132 of the tray 130 downwards pulls the locking bump 144 to make the electrical connector 140 move along the first guiding post 114 through the first guiding groove 146, so as to make the electrical connector 140 located at a side of the chamber 112 move along the second path P2, in which the action process is from FIG. 5A to FIG. 5B.

As a result, the electrical connector 140 in addition to moves downwards through pulling the locking bump 144 by the locking opening 132, the electrical connector 140 also moves to close to the electronic device 52 from a side of the chamber 112. At the time, the locking bump 144 approaches the electronic device 52 with the electrical connector 140 so as to move from a side on the locking opening 132 far away from the chamber 112 to another side close to the chamber 112, in which the action process is from FIG. 4A to FIG. 4B so that the electrical connector 140 is connected the electronic device 52 via the connecting terminal 142.

On the contrary, when the tray 130 upwards moves out of the chamber 112, the locking opening 132 of the tray 130 pushes up the locking bump 144 to make the electrical connector 140 move along the first guiding post 114 through the first guiding groove 146, which makes the electrical connector 140 obliquely move. At the time, with the pushing of the tray 130, the electrical connector 140 upwards moves and sidewise moves from a side of the chamber 112 to be far away from the electronic device 52, in which the action process is from FIG. 4B to FIG. 4A and from FIG. 5B to FIG. 5A. In this way, the electronic device 52 can release the connection from the electrical connector 140 to be detached from the docking station 100.

Figure 6:
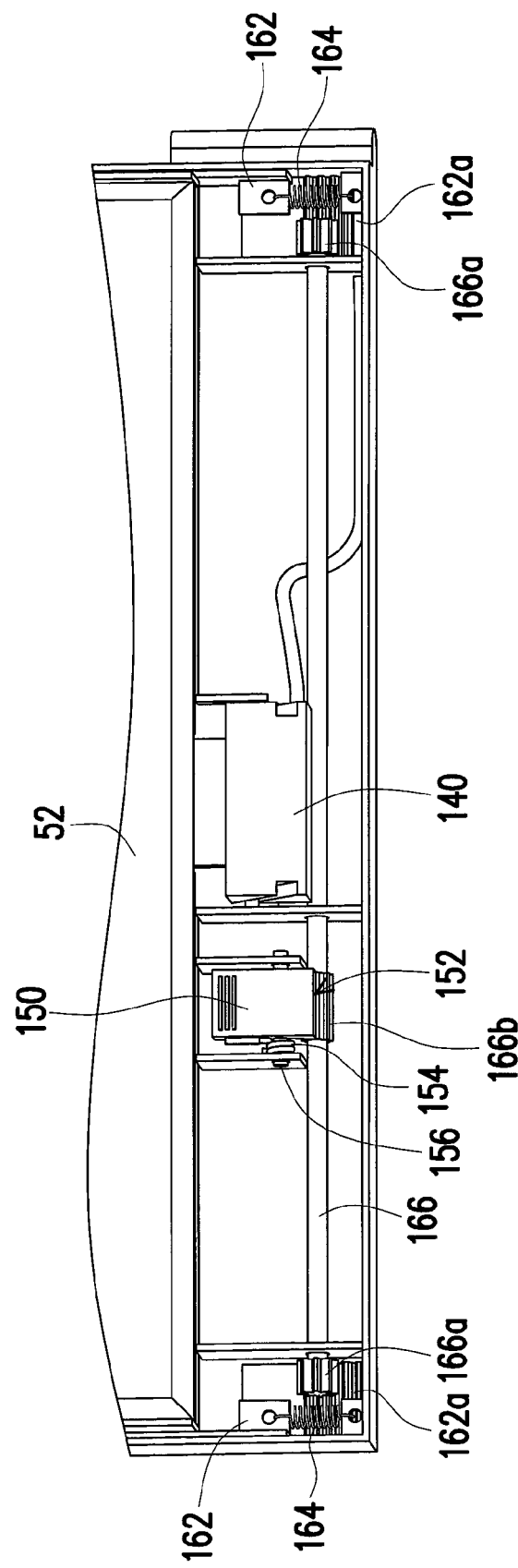
FIG. 6 is a local enlarged diagram of the docking station of FIG. 2A from another angle of view.

FIG. 6 is a local enlarged diagram of the docking station of FIG. 2A from another angle of view. Referring to FIG. 6, as mentioned above, the electronic device 52 is able to, by pressing the button 150, move out of the chamber 112 with the tray 130 moving reversely along the first path P1, and the tray 130 drives the electrical connector 140 to move out of the chamber 112 reversely along the second path P2 to release the connection thereof from the electronic device 52.

In more details, in the embodiment, the docking station 100 has a transmission module 160. The transmission module 160 is disposed at the base 110 and connected to the tray 130, while the button 150 is movably disposed at the base 110 and connected to the transmission module 160 so that the button 150 can control the transmission module 160 to drive the tray 130 for moving or not. When the tray 130 moves into the chamber 112, the button 150 fixes the transmission module 160 so as to make the tray 130 fixed. When the button 150 releases the transmission module 160, the transmission module 160 drives the tray 130 to move out of the chamber 112. In this way, the electronic device 52 can automatically move out of the chamber 112 so that the electronic device 52 can be conveniently detached from the docking station 100.

Specifically in the embodiment, the transmission module 160 includes a transmission element 162, a restoration element 164 and a rotation shaft 166. The transmission element 162 is disposed at a side of the base 110 and connected to the tray 130. The restoration element 164 is connected to the base 110 and the transmission element 162. The rotation shaft 166 is disposed at the base 110. In the embodiment, the transmission module 160 includes two transmission elements 162 and two restoration elements 164, in which, a pair of the transmission element 162 and the restoration element 164 and another pair of the transmission element 162 and the restoration element 164 are respectively disposed at the opposite two ends of a side of the base 110, but the invention does not limit the numbers of transmission elements 162 and the restoration elements 164.

On the other hand, in the embodiment, the rotation shaft 166 has a gear 166a and a ratchet 166b. The transmission element 162 has a rack 162a and the gear 166a is engaged with the rack 162a. Therefore, the rotation shaft 166 in the embodiment has two gears 166a located respectively at the two ends of the rotation shaft 166 and respectively corresponding to the two transmission elements 162 mentioned above. When the transmission elements 162 move in relative to the base 110, the transmission elements 162, through the racks 162a, drive the gears 166a for rotation to make the rotation shaft 166 rotate.

In addition, the button 150 is pivoted to the base 110 and has a pawl 152 and an elastic element 154. The ratchet 166b of the rotation shaft 166 is engaged with the pawl 152, while the elastic element 154 is connected to the button 150 and the base 110. When the transmission element 162 approaches the tray 130, the transmission element 162 stretches the restoration element 164, the rack 162a drives the gear 166a for rotation and drives the rotation shaft 166 for rotation, and the rotation shaft 166 drives the ratchet 166b for rotation to push the pawl 152. When the transmission element 162 moves to get positioned, the elastic element 154 drives the button 150, through the pawl 152 to fix the ratchet 166b, fixes all elements of the transmission module 160. At the time, all the elements of the transmission module 160 stop the movements relative to the base 110. When pressing the button 150 to twist the elastic element 154 so as to release the fixing between the pawl 152 and the ratchet 166b, all the elements of the transmission module 160 can move relatively to the base 110.

Figure 7:
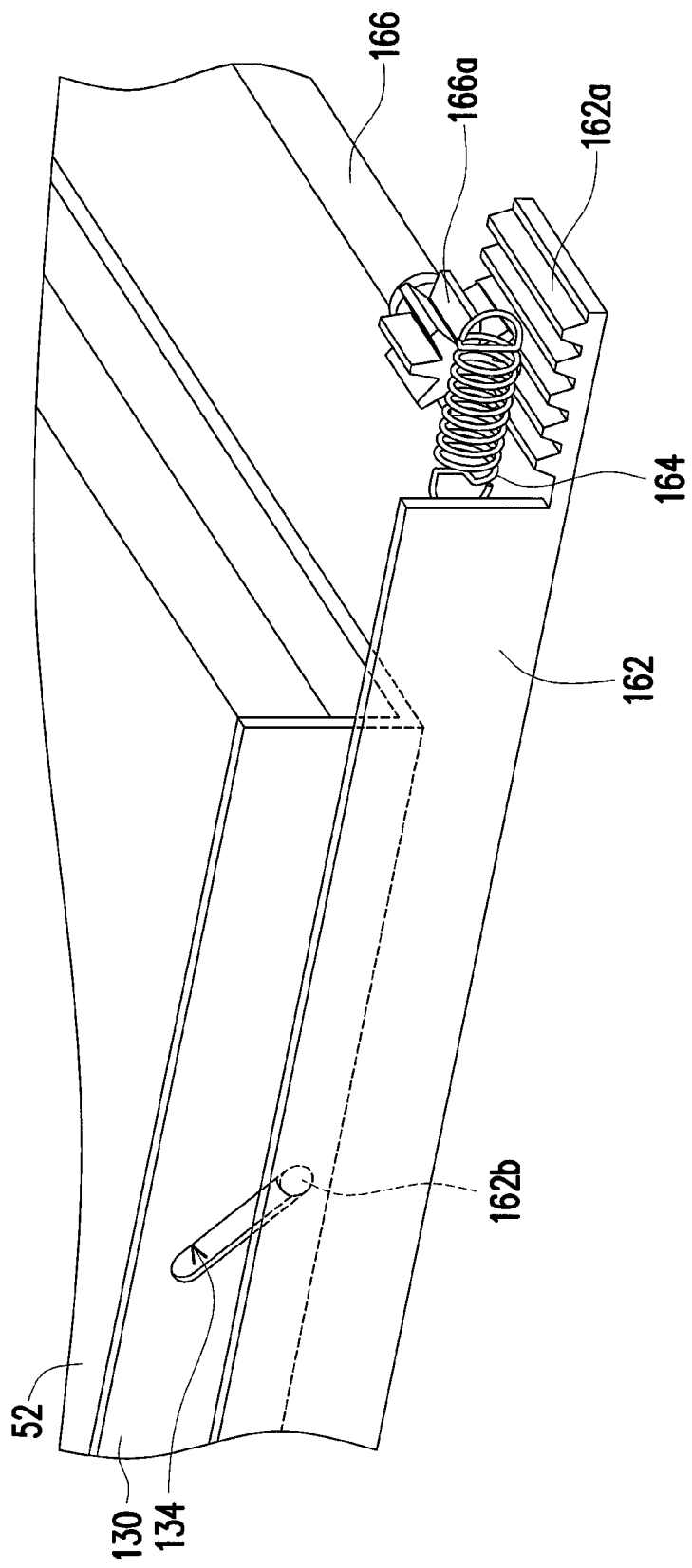
FIG. 7 is a local enlarged diagram of the transmission module of FIG. 6.

FIG. 7 is a local enlarged diagram of the transmission module of FIG. 6. Referring to FIG. 7, in the embodiment, the transmission element 162 has a second guiding post 162b, the tray 130 has a second guiding groove 134, and the second guiding post 162b is engaged with the second guiding groove 134. When the tray 130 moves towards the chamber 112, the tray 130, through the second guiding groove 134 to drive the second guiding post 162b for moving, drives the transmission element 162 to approach the tray 130 and stretches the restoration element 164. When the restoration element 164 drives the transmission element 162 to move far away from the tray 130, the transmission element 162, through the second guiding post 162b to drive the second guiding groove 134 for moving, drives the tray 130 to move out of the chamber 112.

Figure 8A:
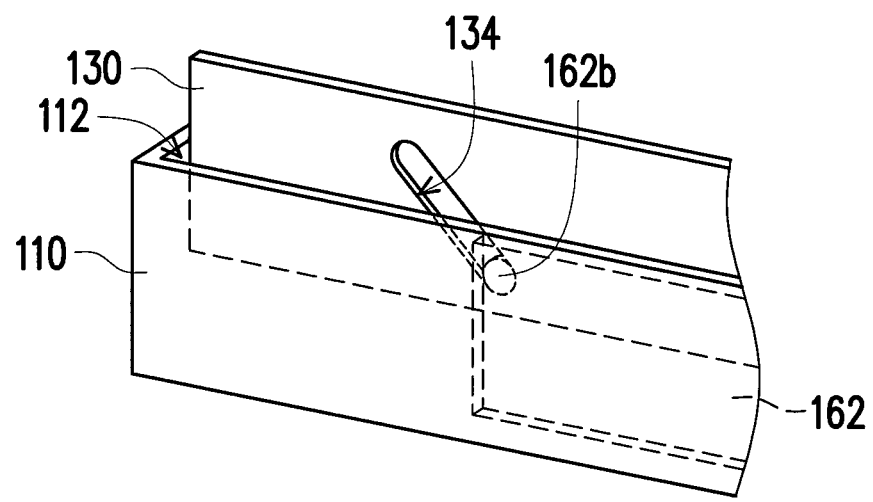
FIG. 8A is a local enlarged diagram of the docking station of FIG. 2A locally at the transmission element.
Figure 8B:
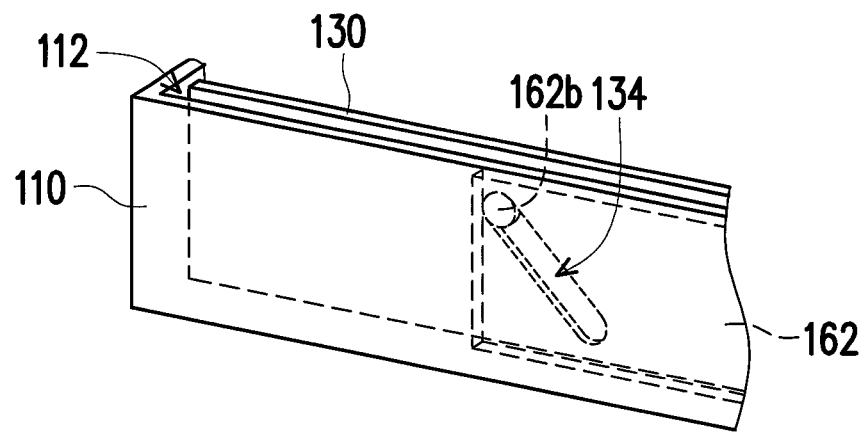
FIG. 8B is a local enlarged diagram of the docking station of FIG. 2B locally at the transmission element.

FIG. 8A is a local enlarged diagram of the docking station of FIG. 2A locally at the transmission element and FIG. 8B is a local enlarged diagram of the docking station of FIG. 2B locally at the transmission element. Referring to FIGS. 8A and 8B, in the embodiment, when the tray 130 drives the electrical connector 140 to move into or out of the chamber 112, the moving direction of the tray 130 (the first path P1) is different from the moving direction of the transmission element 162. Moreover, the moving direction of the transmission element 162 is parallel to the moving direction of the electrical connector 140 (the second path P2), while the first path P1 is roughly perpendicular to the second path P2.

Accordingly, in the embodiment, the second guiding groove 134 of the tray 130 is an oblique guiding groove. When the tray 130 downwards moves into the chamber 112 along the first path P1, the tray 130 drives the second guiding post 162b to move along the second guiding groove 134, so that the transmission element 162 moves along a direction parallel to the second path P2 from a side of the base 110 and approaches the tray 130, in which the action process is from FIG. 8A to FIG. 8B. When the transmission element 162 sidewise moves from a side of the base 110 to be far away from the tray 130, the transmission element 162 drives the second guiding groove 134 to move along the second guiding post 162b, so that the tray 130 upwards moves reversely along the first path P1 out of the chamber 112, in which the action process is from FIG. 8B to FIG. 8A.

Figure 9A:
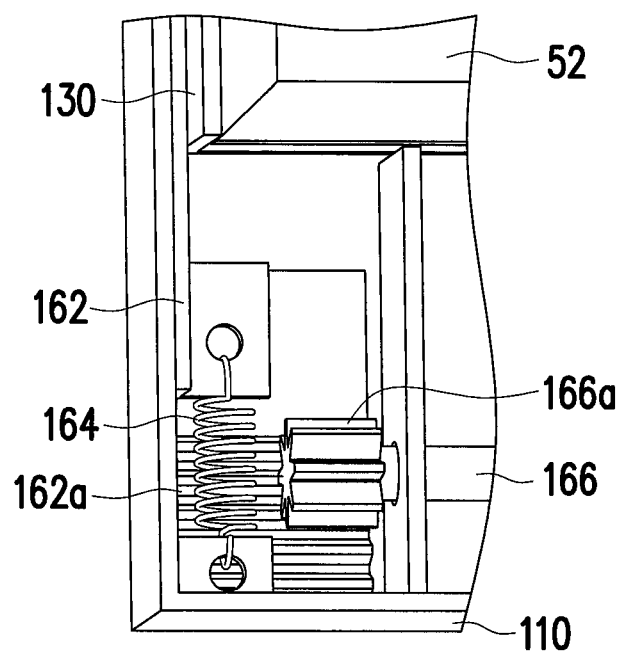
FIG. 9A is a local enlarged diagram of the docking station of FIG. 2A locally at the restoration element.
Figure 9B:
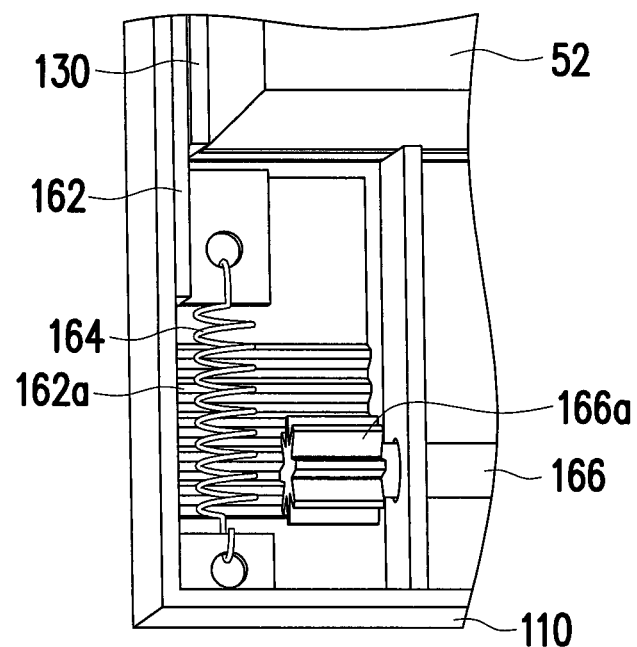
FIG. 9B is a local enlarged diagram of the docking station of FIG. 2B locally at the restoration element.

FIG. 9A is a local enlarged diagram of the docking station of FIG. 2A locally at the restoration element and FIG. 9B is a local enlarged diagram of the docking station of FIG. 2B locally at the restoration element. Referring to FIGS. 9A and 9B, as described above, in the embodiment, the restoration element 164 is connected to the base 110 and the transmission element 162. Thus, when the tray 130 moves into the chamber 112, the tray 130 drives the transmission element 162 to approach the tray 130, and the transmission element 162, through the movement thereof relative to the base 110, stretches the restoration element 164, in which the action process is from FIG. 9A to FIG. 9B.

At the time, the rack 162a of the transmission element 162, with the movement of the transmission element 162, drives the gear 166a for rotation and makes the rotation shaft 166 to rotate. When both the tray 130 and the transmission module 160 move to get positioned as shown by FIG. 9B, the button 150 fixes the rotation shaft 166 so as to fix the transmission module 160, which avoids the restoration element 164 from restoration due to the restoration force thereof to drive the transmission element 162, further avoids affecting the operation of the electronic device 52.

When the button 150 releases the transmission module 160, the button 150 releases the fixing thereof with the rotation shaft 166, so that the rotation shaft 166 is not subject to the engagement relationship between the gear 166a and the rack 162a so that the rotation shaft 166 does not limit the moving of the transmission element 162. At the time, the restoration force of the restoration element 164 drives the transmission element 162 far away from the tray 130 and the transmission element 162 drives the tray 130 to move out of the chamber 112, in which the action process is from FIG. 9B to FIG. 9A.

Figure 10A:
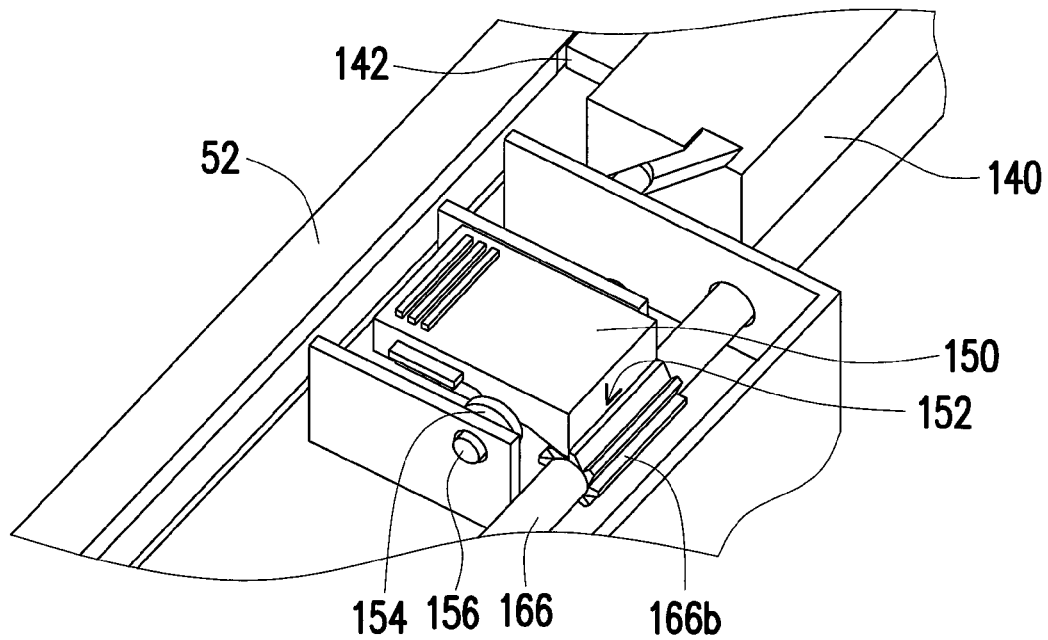
FIG. 10A is a local enlarged diagram of the docking station of FIG. 2A locally at the button.
Figure 10B:
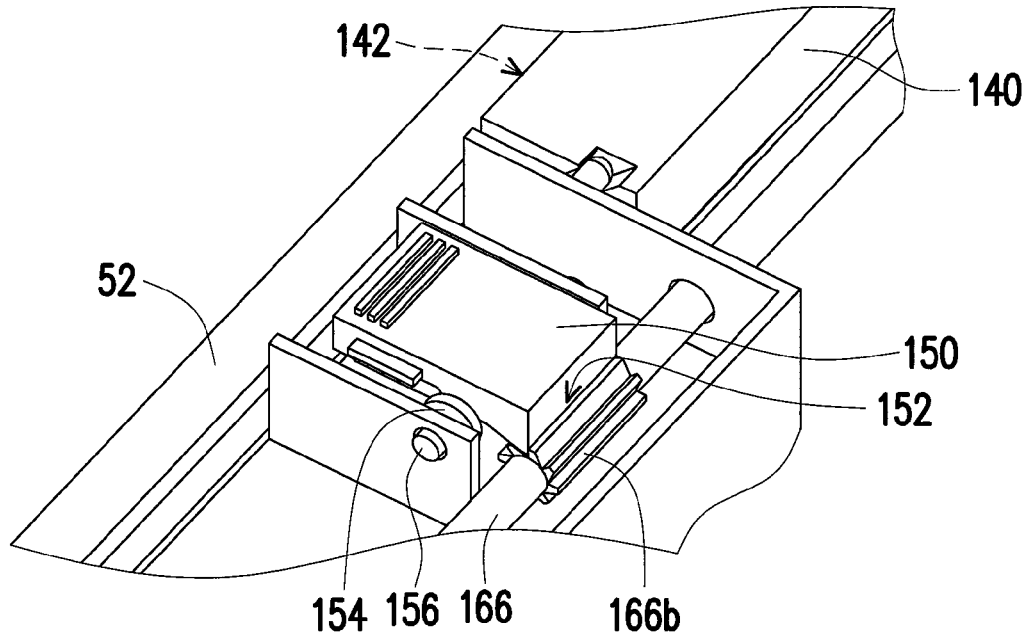
FIG. 10B is a local enlarged diagram of the docking station of FIG. 2B locally at the button.

FIG. 10A is a local enlarged diagram of the docking station of FIG. 2A locally at the button and FIG. 10B is a local enlarged diagram of the docking station of FIG. 2B locally at the button. Referring to FIGS. 10A and 10B, in the embodiment, when the rotation shaft 166 rotates, the rotation shaft 166 brings the ratchet 166b to rotate so as to push the pawl 152. The pawl 152 can limit the ratchet 166b to be rotated in a single direction through the elastic element 154. When the tray 130 downwards moves into the chamber 112 and drives the transmission element 162 to approach the tray 130 from the side edge of the chamber 112, the transmission element 162 drives the rotation shaft 166 to rotate outwards and drives the ratchet 166b to outwards push the pawl 152. When the pawl 152 is outwards pushed by the ratchet 166b, the pawl 152 rotates in relative to the pivoting point 156 thereof at the base 110 to twist the elastic element 154.

In more details, when the rotation shaft 166 rotates to make the ratchet 166b rotate, one of the teeth of the ratchet 166b outwards pushes the pawl 152, so that the pawl 152 rotates in relative to the pivoting point 156 thereof at the base 110 to twist the elastic element 154. After pushing the pawl 152 by the ratchet 166b, the twisted elastic element 154 drives the pawl 152 to be engaged between the adjacent two teeth of the ratchet 166b through the restoration force thereof, which makes the ratchet 166b unable to reversely rotate. When the rotation shaft 166 rotates continuously to make the ratchet 166b rotate, the next tooth of the ratchet 166b outwards pushes the pawl 152 again, so that the pawl 152 rotates in relative to the pivoting point 156 to twist the elastic element 154 again. After pushing the pawl 152 by the ratchet 166b, the elastic element 154 drives the pawl 152 again to be engaged between the adjacent two teeth of the ratchet 166b. In this way, when the rotation shaft 166 rotates continuously, the ratchet 166b intermittently and outwards pushes the pawl 152, and meanwhile and restricts the rotation shaft 166 from reverse rotation through the elastic element 154.

When the transmission element 162 moves to get positioned, the electronic device 52 is disposed in the chamber 112 with the tray 130. At the time, the elastic element 154 drives the button 150 and, through the pawl 152 to retain the ratchet 166b, fixes the rotation shaft 166 and further fixes the transmission element 162. Meanwhile, all the elements of the transmission module 160 stop the movements relative to the base 110, and the tray 130 and the electronic device 52 are fixed in the chamber 112 as well, in which the action process is from FIG. 10A to FIG. 10B. The connecting terminal 142 of the electrical connector 140, through the tray 130 to drive the electrical connector 140, is connected to the electronic device 52, so that the electronic device 52 is electrically connected to the electrical connector 140, and thus the display 120 displays the frames corresponding to the electronic device 52.

It can be seen that when the electronic device 52 is disposed at the tray 130 located outside the chamber 112 as shown by FIG. 2A, the states of all the elements of the docking station 100 are shown by FIGS. 3A, 4A, 5A, 8A, 9A and 10A. When the electronic device 52 in the state as shown by FIG. 2B with the tray 130 moves into the chamber 112 and is connected to the electrical connector 140, the states of all the elements of the docking station 100 are shown by FIGS. 3B, 4B, 5B, 8B, 9B and 10B.

Figure 11:
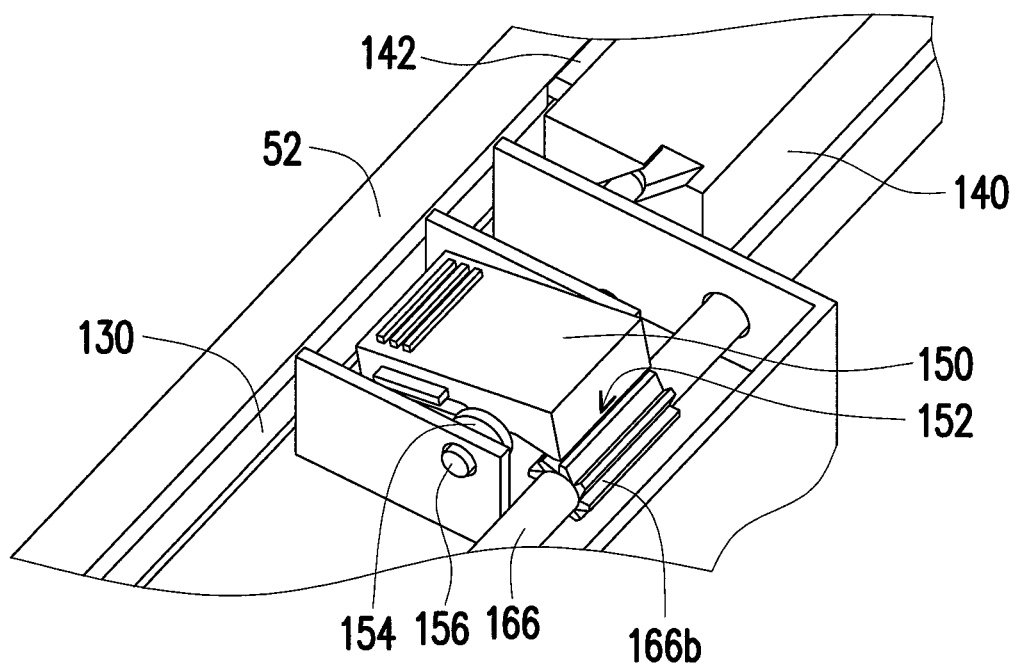
FIG. 11 is a local enlarged diagram of the docking station of FIG. 10B during pressing the button.

FIG. 11 is a local enlarged diagram of the docking station of FIG. 10B during pressing the button. Referring to FIG. 11, when the user wants to detach the electronic device 52 in the chamber 112 and connected to the electrical connector 140 from the docking station 100, the user is able to press the button 150 to make the electronic device 52 automatically release the connection thereof from the electrical connector 140 and to move out of the chamber 112.

In more details, when the user presses the button 150, the button 150, through twisting the elastic element 154, rotates in relative to the pivoting point 156 so as to release the retaining relationship between the pawl 152 and the ratchet 166b, as shown by FIG. 11. At the time, the button 150 releases the rotation shaft 166, and the restoration element 164 uses the restoration force thereof to drive the transmission element 162 moving far away from the tray 130, in which the action process is from FIG. 9B to FIG. 9A. Meanwhile, the transmission element 162 drives the second guiding groove 134 to move along the second guiding post 162b, so that the tray 130 moves out of the chamber 112 from the chamber 112, in which the action process is from FIG. 8B to FIG. 8A.

When the tray 130, driven by the transmission module 160, moves out of the chamber 112, the locking opening 132 of the tray 130 pushes the locking bump 144 to drive the electrical connector 140 moving, in which the action process is from FIG. 4B to FIG. 4A. Meanwhile, the electrical connector 140, through the moving of the first guiding groove 146 along the first guiding post 114, moves out of the chamber 112 to be far away from the electronic device 52, so as to make the electrical connector 140 release the connection thereof from the electronic device 52, in which the action process is from FIG. 5B to FIG. 5A. Thus, the electronic device 52 is able to automatically release the connection thereof from the electrical connector 140 and move outside the chamber 112 by pressing the button 150 and through the action of the transmission module 160, in which the action process is from FIG. 2B to FIG. 2A. In this way, the electronic device 52 can be detachably disposed at the docking station 100 to expand the applications of the electronic device 52.

Figure 12:
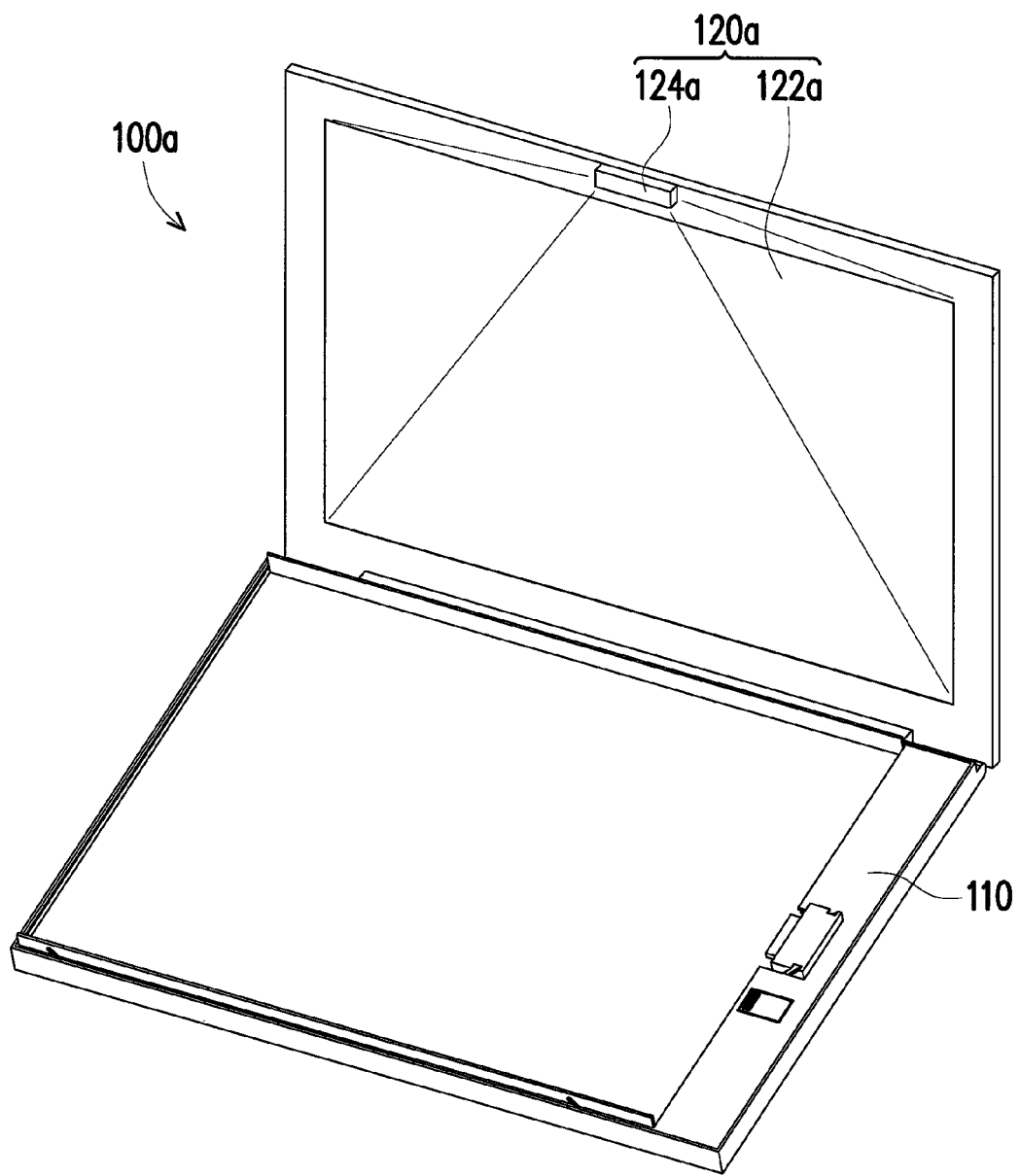
FIG. 12 is a schematic diagram of a docking station according to another embodiment of the invention.

On the other hand, in the embodiment, the display 120 is a flat-panel display. The display 120 is connected to the base 110, and the electronic device 52 can be electrically connected with the display 120 via the electrical connector 140, so that the display 120 displays frames corresponding to the electronic device 52, which the invention is not limited to. FIG. 12 is a schematic diagram of a docking station according to another embodiment of the invention. Referring to FIG. 12, in another embodiment, partial elements of the docking station 100a are the same as the docking station 100 except that the display 120a of the docking station 100a includes a projection screen 122a and a projection module 124a.

Specifically, the projection screen 122a and the projection module 124a are respectively connected to the base 110. The docking station 100a is configured to make the electronic device 52 (as shown by FIG. 2A) detachably disposed therein, and the disposing way thereof is the same as the above-mentioned disposing way of the electronic device 52 at the docking station 100. The projection module 124a is suitable to be electrically connected to the electronic device 52 disposed in the docking station 100a to project the frames corresponding to the electronic device 52 onto the projection screen 122a. In addition, the way of removing the electronic device 52 from the docking station 100a is also the same as the way of removing the electronic device 52 from the docking station 100. In this way, the electronic device 52 can be detachably disposed at the docking station 100 to expand the applications of the electronic device 52.

In summary, the docking station and the display system of the invention make the electronic device detachably disposed at the docking station. When the electronic device is disposed at the chamber, the tray of the docking station under a pressing force moves to drive the electrical connector for moving, so that the electronic device, through the tray, can move into the chamber and be disposed in the chamber, and the tray drives the electrical connector for moving to be electrically connected to the electronic device, so that the frames corresponding to the electronic device are displayed. In addition, the electronic device is able to automatically release the connection thereof from the electrical connector and move outside the chamber by pressing the button and through the action of the transmission module. Therefore, the electronic device can be detachably disposed at the docking station to expand the applications thereof and makes the display system have good usability.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A docking station, comprising:
a base, having a chamber;
a tray, slidingly disposed at the chamber; and
an electrical connector, slidingly disposed at the base and disposed at a side of the tray, wherein the tray moves along a first path under a pressing force to drive the electrical connector for moving along a second path.

2. The docking station as claimed in claim 1, further comprising:
a display, connected to the base and electrically connected to the electrical connector.

3. The docking station as claimed in claim 2, wherein the display is a flat-panel display.

4. The docking station as claimed in claim 2, wherein the display comprises a projection screen and a projection module, and the projection screen and the projection module are respectively connected to the base.

5. The docking station as claimed in claim 1, wherein the base has a first guiding post, the electrical connector has a first guiding groove, the first guiding post is engaged with the first guiding groove so that the electrical connector is able to move in relative to the base, the tray has a locking opening, the electrical connector has a locking bump, and when the tray moves, the tray, by means of engaging the locking bump with the locking opening, drives the electrical connector to move through the moving of the first guiding groove along the first guiding post.

6. The docking station as claimed in claim 1, further comprising:
- a transmission module, disposed at the base and connected to the tray; and
- a button, movably disposed at the base and connected to the transmission module, wherein the button controls the transmission module to drive the tray for moving or not.

7. The docking station as claimed in claim 6, wherein the transmission module comprises:
- a transmission element, disposed at a side of the base and connected to the tray;
- a restoration element, connected to the base and the transmission element.

8. The docking station as claimed in claim 7, wherein the transmission element has a second guiding post, the tray has a second guiding groove, the second guiding post is engaged with the second guiding groove, and the restoration element drives the transmission element, and then drives the second guiding groove for moving through the second guiding post, and finally drives the tray for moving.

9. The docking station as claimed in claim 7, wherein the transmission module further comprises:
- a rotation shaft, disposed at the base and having a gear and a ratchet, wherein the transmission element has a rack, the gear is engaged with the rack, the button is pivoted to the base and has an elastic element and a pawl, the elastic element is connected to the button and the base, and the ratchet is engaged with the pawl.

10. The docking station as claimed in claim 1, wherein the first path is roughly perpendicular to the second path.

11. The docking station as claimed in claim 1, wherein the first path is roughly parallel to the normal direction of the chamber.

12. A display system, comprising:
- an electronic device; and
- a docking station, comprising:
  - a base, having a chamber;
  - a tray, slidingly disposed at the chamber along a first path; and
  - an electrical connector, slidingly disposed at the base and disposed at a side of the tray, wherein when the tray moves along the first path under a pressing force, the tray drives the electrical connector for moving along a second path so that the electrical connector is electrically connected to the electronic device.

13. The display system as claimed in claim 12, wherein the docking station further comprises a display connected to the base and electrically connected to the electrical connector, and the electronic device is electrically connected to the display through the electrical connector so that the display displays a frame corresponding to the electronic device.

14. The display system as claimed in claim 13, wherein the display comprises a projection screen and a projection module, the projection screen and the projection module are respectively connected to the base, and the projection module is suitable for being electrically connected to the electronic device to project the frame corresponding to the electronic device onto the projection screen.

15. The display system as claimed in claim 14, wherein dimensions of length and width of the electronic device are roughly the same as dimensions of length and width of the chamber.

* * * * *